UNITED STATES PATENT OFFICE.

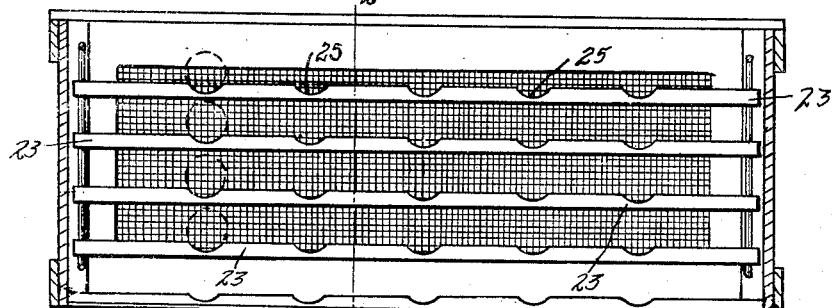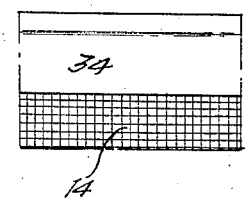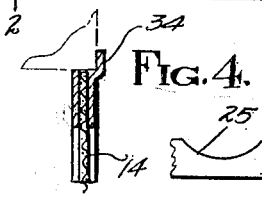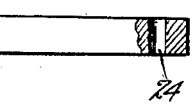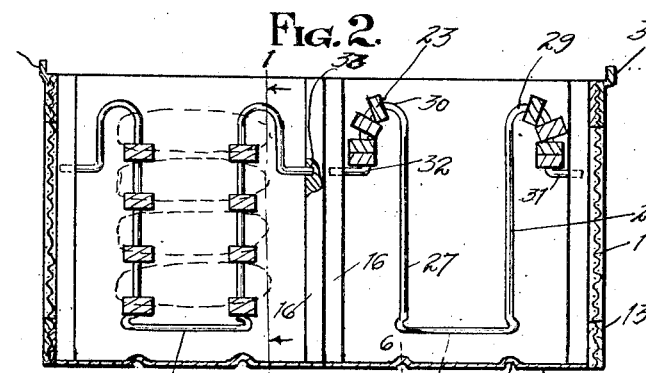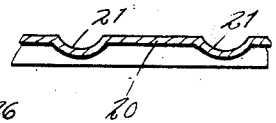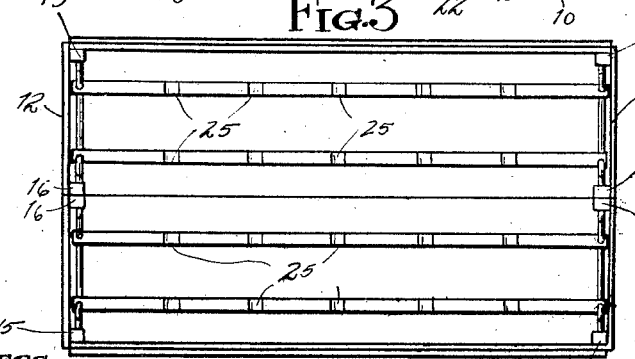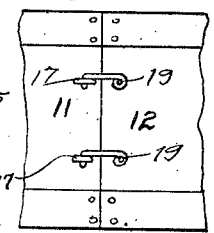

OLE G. VOLD, OF FOREST CITY, IOWA.

SEED-CORN CABINET AND DRIER.

1,346,070.  Specification of Letters Patent.  Patented July 6, 1920.

Application filed July 16, 1919. Serial No. 311,378.

*To all whom it may concern:*

Be it known that I, OLE G. VOLD, a citizen of the United States, and a resident of Forest City, in the county of Winnebago and State of Iowa, have invented a certain new and useful Seed-Corn Cabinet and Drier, of which the following is a specification.

My invention relates to a seed corn cabinet and drier for stacking, preserving and drying seed corn.

The object of my invention is to provide a seed corn cabinet and drier of simple, durable and inexpensive construction.

A further object is to provide such a seed corn cabinet and drier, which is made in sections, each section composed of end walls, a bottom and a side. The sections are designed to be placed side by side, and secured together with the open sides adjacent to each other.

A further object is to provide such a device having sections which may be placed one upon another, and having means for holding these sections in place, whereby the bottom of one of the sections is utilized as a cover member for the section below.

A further object is to provide such a seed corn cabinet and drier having slats therein for supporting ears of corn. The slats are designed to be moved to various positions and when in one position to support ears of corn, thereby using the sections as a drier, and when in another of its positions to use the sections as a cabinet for storing corn.

With these and other objects in view my my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a sectional view of one of the sections taken on the line 1—1 of Fig. 2, showing the seed corn rack embodying my invention.

Fig. 2 shows a sectional view on line 2—2 of Fig. 1 showing the slats in one of the sections in one of its positions, and the slats in the other section in another of its positions.

Fig. 3 shows a top view of the device showing two of the sections together.

Fig. 4 shows a detailed sectional view, showing the guides on the upper sides of the sections.

Fig. 5 shows a detailed view of one of the sides.

Fig. 6 shows a sectional view on line 6—6 of Fig. 2.

Fig. 7 shows an enlarged view of the corn supporting racks.

Fig. 8 shows an end view of two of the sections secured together.

In the illustration of my invention shown in the accompanying drawings, I have shown a seed corn cabinet and drier comprising sections, each section having end walls, a side wall and a bottom. The bottom and end walls are preferably made of sheet metal.

The reference character 10 indicates the bottom and 11 and 12 the end walls. 13 is the side wall, which has a screen portion 14 therein for permitting the free passage of air into the seed corn cabinet, but prevents any mice from destroying the corn stored within the cabinet.

In each of the sections are the outer corner upright members 15 and the inner corner members 16. The end walls 11 and 12 are each secured to corner up-right members 15 and 16. The end walls 11 have eyebolts 17 thereon and the end walls 12 have hooks 19 thereon designed to coact with the eyebolts 17 for holding the sections together. The eyebolts 17 and hooks 19 are in alinement with each other. This forms a means for readily engaging or disengaging the sections from each other.

The bottom 10 has the raised portions 20 in which are formed recesses 21. In the recesses 21 are placed ears of corn, thereby utilizing the bottom 10 for supporting ears of corn which are desired to be dried.

Secured in the up-right corner members 15 and 16 are the guides 22, upon which are slidably mounted the slats or corn supporting racks 23. The racks 23 have in their ends an opening 24, which receives the guide 22. The racks 23 have grooved portions or recesses 25 therein. The recesses 25 receive the ears of corn substantially as is shown in Fig. 2 of the drawings. The guides 22 have the vertical portions 26 and 27, which are fastened together at their lower ends by the horizontal portion 28. At the upper ends of the vertical portions 26 and 27 of the guide 22 are the inverted U-shaped members 29 and 30. Outwardly extending portions 31 and 32 are secured to the inverted U-shaped members 29 and 30 respectively. The portions 31 and 32 are designed to be received in openings 33 formed in the up-right corner members 15 and 16.

The guides 22 are formed of resilient material, so that when it is desired to place the guides 22 into the up-right corner members 15 and 16, the up-right portions 26 and 27 are drawn toward each other and then the extending portions 31 and 32 are placed in alinement with the opening 33 of the corner up-right. When the vertical portions 26 and 27 of the guides 22 are released from their drawn position, the extending portions 31 and 32 will be received in the openings 33 of the corner members 15 and 16 respectively. By making the guides 22 of resilient material, it will be seen that there is formed a device in which the guides may be quickly installed so that when any of the racks 23 are broken, and it is desired to replace them, all that is necessary is to remove the guides 22 and slide the rack 23 off of the guides and place the new one thereon, and then by the operation just stated, replace the guides 22 in their proper position. The racks 23 are designed to be slidably received upon the guides 22, whereby ears of corn of various sizes may be accommodated without any trouble.

The right hand side of Fig. 2 of the drawings shows the corn supporting racks 23 in one of their positions, so that the section may be utilized for storing corn instead of drying it. The left hand side of Fig. 2 shows the supporting racks in another of their positions, whereby ears of corn may be supported on said racks for drying and preserving the corn.

Formed on the walls 13 is the upwardly and outwardly extending flange 34. When two of the sections are placed together, as is shown in Fig. 2, the flange 34 forms a guide for receiving the lower end of the sections, which are designed to be placed one upon the other.

In the practical operation of my device, when it is desired to use it as a seed corn drier, two of the racks 23 are lowered from the position shown on the right in Fig. 2 to the position shown on the left of Fig. 2. Ears of corn are then placed, so that the ears are received in the groove 25 of the racks 23. Then the last two racks are lowered, and the operation is continued until the corn is placed in the position shown in Fig. 2 of the drawing.

It will be seen that the racks 23 are limited from further downward movement by the ears of corn directly below. In this way, it will be seen that I have provided a seed corn drier, which may accommodate any sizes of ears of corn. When I desire to remove the corn from the drier, I take the upper row of ears of corn off the two upper racks, and then move the upper two racks around the U-shaped members 29 and 30, and allow the upper racks to rest upon the portions 31 and 32. The next row of ears of corn is then ready to be removed. Just as soon as the ears of corn are removed, the racks are moved upwardly and around the U-shaped members, thereby moving the racks out of the way for the removal of further corn from the cabinet. After all the corn is removed, the racks will be left in the position shown on the right hand side of Fig. 2 of the drawings. It will be noted that my device is designed to be used both as a seed corn drier and cabinet for storing of the corn after the corn has been dried.

When the racks are in their inoperative position, then the sections may be used for the storing of corn. By having the racks in this position, a greater amount of corn may be stored within the sections than could be if the racks were permanently left in their operative position.

By making the seed corn cabinet and drier in sections and securing them together with their open sides adjacent to each other, I am able to greatly reduce the cost of the manufacture of the cabinet and drier. By having the upper side of the cabinet open and utilizing the bottom of one of the sections as a cover member for the cabinet or section below, I am, thereby, able to reduce the cost of manufacturing a great deal. It will be seen that in my cabinet and drier, the object is to make it in sections, which are designed to be placed side by side and then one upon the other.

Some changes may be made in the construction and arrangement of the various parts of my improved device without departing from the essential features and purposes thereof, and it is my intention to cover by my claims any modified forms of structure or use of mechanical equivalents which may be reasonably included within the scope of my claims.

I claim as my invention:

1. A seed corn cabinet and drier having sections, each section being provided with a bottom and ends, and a side wall, said side wall being made of screen, so as to permit the passage of air, up-right corner members within said sections, spaced guides, having their ends fixed in said corner members, whereby corn rests may be slidably received on said guides.

2. A seed corn cabinet and drier, having sections formed with a bottom, end members and a side wall, said sections being designed to be locked together side by side with their open sides adjacent to each other, vertical corner members within each of said sections, spaced resilient guide members comprising vertical spaced up-rights, having a horizontal portion at their lower ends, and inverted U-shaped members at their upper ends; the free end of said inverted U-shaped members being fixed to said vertical up-right corner members; corn rests comprising slats, slidably mounted on said guides whereby ears of corn of various sizes may be placed upon said corn rests.

3. A seed corn cabinet and drier, having sections formed with a bottom, end members and a side wall, said sections being designed to be locked together side by side with their open sides adjacent to each other, vertical corner members within each of said sections, spaced resilient guide members comprising vertical spaced up-rights, having a horizontal portion at their lower ends, and inverted U-shaped members at their upper ends; the free end of said inverted U-shaped members being fixed to said vertical up-right corner members; corn rests comprising slats, slidably mounted on said guides, and outwardly and upwardly extending flange on said side wall forming a guide whereby sections may be placed one upon another, the bottom of one forming a cover member for the other.

4. A seed corn cabinet and drier having sections formed with a bottom, said bottom having parallel raised portions in which are formed recesses for receiving ears of corn, end members and a side wall, said sections being designed to be locked together side by side with their open sides adjacent to each other; vertical corner members within each of said sections, spaced resilient guide members comprising vertical spaced up-rights, having horizontal portions at their lower ends and inverted U-shaped members at their upper ends; the free end of said inverted U-shaped members being fixed to said vertical up-right corner members; corn rests comprising slats slidably mounted on said guides, whereby ears of corn of various sizes may be placed upon said corn rests.

Des Moines, Iowa, June 17, 1919.

OLE G. VOLD.